(12) United States Patent
Piller et al.

(10) Patent No.: US 9,579,732 B2
(45) Date of Patent: Feb. 28, 2017

(54) HOLE SAW

(71) Applicant: Milwaukee Electric Tool Corporation, Brookfield, WI (US)

(72) Inventors: Geoffrey R. Piller, Whitefish Bay, WI (US); Jason M. Thom, Wauwatosa, WI (US); Ryan J. Malloy, Milwaukee, WI (US); Todd A. Taylor, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 319 days.

(21) Appl. No.: 13/945,643

(22) Filed: Jul. 18, 2013

(65) Prior Publication Data

US 2014/0023446 A1  Jan. 23, 2014

Related U.S. Application Data

(60) Provisional application No. 61/673,124, filed on Jul. 18, 2012, provisional application No. 61/717,389, (Continued)

(51) Int. Cl.
*B23B 51/04* (2006.01)

(52) U.S. Cl.
CPC .... *B23B 51/0406* (2013.01); *B23B 2260/072* (2013.01); *Y10T 408/895* (2015.01)

(58) Field of Classification Search
CPC ............... Y10T 408/81; Y10T 408/895; Y10T 408/8953; Y10T 408/896; B23B 51/04; B23B 51/0406; B23B 51/05
See application file for complete search history.

(56) References Cited

U.S. PATENT DOCUMENTS 118,806 A  9/1871 Lafferty et al.
308,842 A  12/1884 Hunt
(Continued)

FOREIGN PATENT DOCUMENTS

AU  WO 0009284 A1 *  2/2000  ........... B23B 49/005
CN  2303698  1/1999
(Continued)

OTHER PUBLICATIONS

Makita Industrial Power Tools, 2003-2004 General Catalog (2003) 2 pages.
(Continued)

*Primary Examiner* — Eric A Gates
*Assistant Examiner* — Donte Brown
(74) *Attorney, Agent, or Firm* — Michael Best & Friedrich LLP

(57) ABSTRACT

A hole saw includes a cylindrical body disposed along an axis of rotation with a side wall extending axially from a cap end to a cutting end. The cutting end includes a plurality of cutting teeth. A cap includes a rim portion seated on the cap end and an axially extending portion extending into the cylindrical body from the cap end. The side wall defines an aperture including a first slot portion and a second slot portion disposed closer to the cap end than the first slot portion. A wall of the second slot portion nearest the cap end is between approximately 0.010 inches and approximately 0.120 inches axially offset from the axially extending portion of the cap.

19 Claims, 11 Drawing Sheets

Related U.S. Application Data filed on Oct. 23, 2012, provisional application No. 61/784,172, filed on Mar. 14, 2013.

(56) References Cited

U.S. PATENT DOCUMENTS

| | | |
|---|---|---|
| 2,015,339 A | 9/1935 | Ellingham |
| 2,062,257 A | 11/1936 | Douglas et al. |
| 2,237,901 A | 4/1941 | Chun |
| 2,319,528 A * | 5/1943 | Barbour et al. ............ 408/205 |
| 2,349,400 A | 5/1944 | Wendell |
| 2,412,433 A | 12/1946 | Taylor |
| 2,427,085 A * | 9/1947 | Allison .................... 408/145 |
| 2,444,099 A | 6/1948 | Hennessey, Jr. |
| 2,473,077 A | 6/1949 | Starbuck, Jr. |
| 2,615,245 A | 10/1952 | Schaumleffel |
| 2,662,428 A * | 12/1953 | Mueller .................... 408/224 |
| 2,754,864 A | 7/1956 | Elsy |
| 2,800,812 A * | 7/1957 | Mueller et al. ............. 408/67 |
| 2,951,683 A | 9/1960 | Tilden |
| 3,074,392 A | 1/1963 | Fisher |
| 3,162,067 A | 12/1964 | Koons et al. |
| 3,265,104 A | 8/1966 | Gallo, Sr. |
| 3,331,455 A | 7/1967 | Anderson, Jr. et al. |
| 3,382,743 A | 5/1968 | Trevathan |
| 3,374,696 A | 3/1969 | Trevathan |
| 3,494,348 A | 2/1970 | Lindblad |
| 3,647,310 A | 3/1972 | Morse |
| 3,778,179 A | 12/1973 | Rivas |
| 3,824,026 A | 7/1974 | Gaskins |
| 3,836,278 A | 9/1974 | McInnes |
| 3,870,431 A | 3/1975 | Luckenbill et al. |
| 3,920,350 A | 11/1975 | Southall |
| 3,973,862 A | 8/1976 | Segal |
| 3,976,387 A | 8/1976 | Segal |
| 3,997,279 A | 12/1976 | Porter |
| 4,072,441 A | 2/1978 | LaPointe |
| 4,077,737 A | 3/1978 | Morse |
| 4,078,458 A | 3/1978 | Berendzen |
| 4,101,238 A | 7/1978 | Reibetanz et al. |
| 4,147,464 A | 4/1979 | Watson et al. |
| 4,148,593 A | 4/1979 | Clark |
| 4,189,015 A | 2/1980 | Acker et al. |
| 4,201,502 A | 5/1980 | Skendrovic |
| 4,203,692 A | 5/1980 | Jensen |
| 4,225,275 A | 9/1980 | Elliott |
| 4,303,357 A | 12/1981 | Makar |
| 4,330,229 A | 5/1982 | Croydon |
| D278,065 S | 3/1985 | Sydlowski et al. |
| 4,527,449 A | 7/1985 | Sydlowski et al. |
| 4,529,341 A | 7/1985 | Greene |
| D282,369 S | 1/1986 | de Villiers |
| 4,565,471 A | 1/1986 | Negishi et al. |
| 4,568,227 A | 2/1986 | Hogg |
| 4,582,458 A | 4/1986 | Korb et al. |
| 4,595,321 A | 6/1986 | Van Dalen |
| 4,605,347 A | 8/1986 | Jodock et al. |
| 4,741,651 A | 5/1988 | Despres |
| 4,755,087 A | 7/1988 | Parent |
| 4,759,667 A | 7/1988 | Brown |
| 4,760,643 A * | 8/1988 | Juma ........................ 408/206 |
| D303,118 S | 8/1989 | Cox |
| 4,906,146 A | 3/1990 | Bowling |
| 4,961,674 A * | 10/1990 | Wang et al. ................. 408/14 |
| 4,968,189 A | 11/1990 | Pidgeon |
| 4,968,193 A | 11/1990 | Chaconas et al. |
| 5,007,777 A | 4/1991 | Itokazu |
| D317,455 S | 6/1991 | Martin |
| 5,025,871 A | 6/1991 | Stewart et al. |
| 5,049,010 A | 9/1991 | Oakes |
| 5,061,126 A | 10/1991 | Cain et al. |
| D321,894 S | 11/1991 | Harris |
| 5,069,584 A | 12/1991 | Obermeier et al. |
| 5,076,741 A | 12/1991 | Litlehorn |
| 5,096,341 A | 3/1992 | Despres |
| 5,098,234 A | 3/1992 | Judkins et al. |
| 5,115,796 A * | 5/1992 | Schweickhardt .......... 125/13.01 |
| 5,145,018 A | 9/1992 | Schimke et al. |
| 5,171,111 A | 12/1992 | Kishimoto |
| D332,492 S | 1/1993 | Rosenberg et al. |
| D334,016 S | 3/1993 | Jonsson |
| 5,205,685 A | 4/1993 | Herbert |
| D342,270 S | 12/1993 | Kwang |
| 5,273,380 A | 12/1993 | Musacchia |
| 5,288,183 A | 2/1994 | Chaconas et al. |
| 5,291,806 A | 3/1994 | Bothum |
| 5,316,416 A | 5/1994 | Kim |
| 5,353,552 A | 10/1994 | Hemmings |
| 5,392,759 A * | 2/1995 | Kwang ........................ 125/15 |
| 5,415,504 A | 5/1995 | Wolf et al. |
| 5,435,672 A | 7/1995 | Hall et al. |
| 5,451,128 A | 9/1995 | Hattersley |
| D363,294 S | 10/1995 | Ellis |
| 5,466,100 A | 11/1995 | Ahluwalia |
| D372,485 S | 8/1996 | Stone et al. |
| 5,556,399 A | 9/1996 | Huebner |
| D376,809 S | 12/1996 | Stone et al. |
| 5,649,796 A | 7/1997 | Durney |
| 5,651,646 A | 7/1997 | Banke et al. |
| 5,690,452 A | 11/1997 | Baublits |
| 5,700,113 A | 12/1997 | Stone et al. |
| D391,974 S | 3/1998 | Brutscher |
| D392,297 S | 3/1998 | Brutscher |
| D394,663 S | 5/1998 | Stone et al. |
| 5,762,498 A | 6/1998 | Gonzalez |
| 5,803,677 A | 9/1998 | Brutscher et al. |
| 5,810,524 A | 9/1998 | Wirth, Jr. et al. |
| 5,816,754 A | 10/1998 | Shallenberger |
| 5,842,820 A | 12/1998 | Lee et al. |
| 5,888,036 A | 3/1999 | Arai et al. |
| D408,424 S | 4/1999 | Schmotzer |
| 5,904,454 A | 5/1999 | Washer |
| 5,931,615 A | 8/1999 | Wiker |
| 5,934,845 A | 8/1999 | Frey |
| 5,980,169 A | 11/1999 | Hinch |
| 6,007,279 A | 12/1999 | Malone, Jr. |
| D419,576 S | 1/2000 | Burcher et al. |
| 6,036,410 A | 3/2000 | Shun'ko |
| 6,050,754 A | 4/2000 | Thomas |
| 6,113,321 A | 9/2000 | Mulroy et al. |
| 6,126,367 A | 10/2000 | Reed |
| 6,152,815 A | 11/2000 | Meerdink et al. |
| 6,167,792 B1 | 1/2001 | Korb et al. |
| D438,219 S | 2/2001 | Brutscher |
| 6,190,097 B1 | 2/2001 | Thomas |
| 6,206,616 B1 | 3/2001 | Smith et al. |
| 6,267,542 B1 | 7/2001 | Salmon |
| 6,269,722 B1 | 8/2001 | Hellbergh |
| 6,273,652 B1 | 8/2001 | Wirth, Jr. et al. |
| D447,495 S | 9/2001 | Strobel et al. |
| 6,341,925 B1 | 1/2002 | Despres |
| D455,446 S | 4/2002 | Collins |
| 6,409,436 B1 | 6/2002 | Despres |
| 6,419,428 B2 | 7/2002 | Ajimi et al. |
| 6,428,250 B2 | 8/2002 | Giebmanns |
| 6,431,289 B1 | 8/2002 | Potter et al. |
| 6,443,674 B1 | 9/2002 | Jaconi |
| 6,588,310 B2 | 7/2003 | Lee et al. |
| 6,588,992 B2 | 7/2003 | Rudolph |
| 6,599,063 B1 | 7/2003 | Capstran |
| D478,105 S | 8/2003 | Morton et al. |
| D478,106 S | 8/2003 | Morton et al. |
| D478,339 S | 8/2003 | Morton et al. |
| D478,919 S | 8/2003 | Morton et al. |
| 6,619,413 B2 | 9/2003 | Hamilton et al. |
| 6,641,338 B2 | 11/2003 | Despres |
| 6,641,395 B2 | 11/2003 | Kumar et al. |
| 6,652,203 B1 | 11/2003 | Risen, Jr. |
| 6,676,342 B2 | 1/2004 | Mast et al. |
| 6,676,711 B2 | 1/2004 | Omi |
| 6,698,981 B1 | 3/2004 | Beno et al. |
| 6,705,807 B1 | 3/2004 | Rudolph et al. |
| 6,746,187 B2 | 6/2004 | Alm |
| 6,786,684 B1 | 9/2004 | Ecker |
| D497,547 S | 10/2004 | Kumakura et al. |

(56) References Cited

U.S. PATENT DOCUMENTS

| | | | |
|---|---|---|---|
| 6,817,428 B1 | 11/2004 | Miyanaga | |
| 6,820,519 B2 | 11/2004 | Lefebvre | |
| 6,857,831 B2 | 2/2005 | Davis | |
| 6,857,832 B2 | 2/2005 | Nygård | |
| 6,863,529 B2 | 3/2005 | Strong et al. | |
| D504,446 S | 4/2005 | Kobayashi | |
| 6,884,245 B2 | 4/2005 | Spranza, III | |
| 6,890,133 B2 | 5/2005 | Singh et al. | |
| 6,893,194 B2 | 5/2005 | Jones et al. | |
| D507,585 S | 7/2005 | Held | |
| 6,939,092 B2 | 9/2005 | Korb et al. | |
| 6,945,414 B1 | 9/2005 | Stevens et al. | |
| 6,945,850 B2 | 9/2005 | Perrey | |
| 6,948,574 B2 | 9/2005 | Cramer et al. | |
| 6,988,859 B2 | 1/2006 | Borschert et al. | |
| 7,001,116 B2 | 2/2006 | Kozak | |
| D516,594 S | 3/2006 | Morton | |
| 7,017,465 B2 | 3/2006 | Dion et al. | |
| 7,018,143 B2 | 3/2006 | Moore | |
| D519,531 S | 4/2006 | Kobashi | |
| D523,398 S | 6/2006 | Ellis | |
| D526,670 S | 8/2006 | Ibey | |
| 7,112,016 B2 | 9/2006 | Nordlin | |
| D529,525 S | 10/2006 | Waldron et al. | |
| 7,127,923 B2 | 10/2006 | Biederman et al. | |
| 7,140,451 B2 | 11/2006 | Yoshimizu et al. | |
| 7,160,064 B2 | 1/2007 | Jasso | |
| 7,175,372 B2 | 2/2007 | Davis | |
| 7,201,543 B2 | 4/2007 | Muhlfriedel et al. | |
| D544,892 S | 6/2007 | Watson et al. | |
| 7,237,291 B2 * | 7/2007 | Redford | B25B 13/06 7/138 |
| 7,237,984 B1 | 7/2007 | Guzda et al. | |
| 7,237,986 B2 | 7/2007 | Anjanappa et al. | |
| 7,246,975 B2 | 7/2007 | Corso et al. | |
| D551,269 S | 9/2007 | Burke, III | |
| 7,264,428 B2 | 9/2007 | Cossette | |
| 7,267,514 B2 | 9/2007 | Wetzl et al. | |
| 7,275,898 B2 | 10/2007 | Malagnino et al. | |
| 7,306,411 B2 | 12/2007 | Mabuchi et al. | |
| D559,874 S | 1/2008 | Kobayashi | |
| D560,699 S | 1/2008 | Omi | |
| D571,835 S | 6/2008 | Concari et al. | |
| D573,165 S | 7/2008 | Grundvig | |
| D575,808 S | 8/2008 | Zeiler et al. | |
| 7,438,509 B1 | 10/2008 | Wong et al. | |
| D580,462 S | 11/2008 | Liao et al. | |
| 7,476,067 B2 | 1/2009 | Borschert et al. | |
| D585,919 S | 2/2009 | Cantlon | |
| D585,920 S | 2/2009 | Liao et al. | |
| 7,488,146 B2 | 2/2009 | Brunson | |
| D588,175 S | 3/2009 | Morton | |
| D588,884 S | 3/2009 | Burke, III | |
| 7,513,718 B1 | 4/2009 | Arnold | |
| 7,520,703 B2 | 4/2009 | Rompel | |
| 7,556,459 B2 | 7/2009 | Rompel | |
| 7,637,703 B2 | 12/2009 | Khangar et al. | |
| D608,801 S | 1/2010 | Evatt et al. | |
| D608,802 S | 1/2010 | Ibarra et al. | |
| 7,658,136 B2 | 2/2010 | Rompel et al. | |
| 7,658,576 B1 | 2/2010 | Buzdum et al. | |
| 7,661,913 B2 | 2/2010 | Nordlin | |
| 7,661,993 B2 | 2/2010 | Nordlin | |
| 7,665,935 B1 | 2/2010 | Garrick et al. | |
| 7,674,078 B1 | 3/2010 | Buzdum et al. | |
| D615,839 S | 5/2010 | Richter et al. | |
| 7,766,583 B2 | 8/2010 | Kozak | |
| 7,824,137 B2 | 11/2010 | Vasudeva et al. | |
| 7,850,405 B2 | 12/2010 | Keightley | |
| D630,656 S | 1/2011 | Lambert et al. | |
| 7,871,224 B2 | 1/2011 | Dost et al. | |
| 7,892,235 B2 | 2/2011 | Ellis | |
| D634,343 S | 3/2011 | Burke, III | |
| 7,913,601 B2 | 3/2011 | Petts et al. | |
| 7,934,893 B2 | 5/2011 | Gillissen | |
| 7,938,600 B1 | 5/2011 | Griep et al. | |
| 7,959,371 B2 | 6/2011 | Keightley | |
| 7,967,535 B2 | 6/2011 | Eiserer et al. | |
| 7,988,389 B2 | 8/2011 | Miebach | |
| 8,042,613 B2 | 10/2011 | Hallundbaek et al. | |
| D659,176 S | 5/2012 | Novak et al. | |
| D664,574 S | 7/2012 | Burke, III | |
| 8,328,474 B2 | 12/2012 | Pangerc et al. | |
| 8,328,476 B2 | 12/2012 | O'Keefe et al. | |
| D687,472 S * | 8/2013 | Novak et al. | D15/139 |
| D690,334 S * | 9/2013 | Zielonka et al. | D15/139 |
| D692,470 S * | 10/2013 | Novak et al. | D15/139 |
| 8,573,907 B2 | 11/2013 | Kalomeris et al. | |
| 8,579,554 B2 | 11/2013 | Novak et al. | |
| 8,646,601 B2 | 2/2014 | Green et al. | |
| D701,544 S * | 3/2014 | Novak et al. | D15/139 |
| D706,845 S * | 6/2014 | Richter | D15/139 |
| D708,650 S * | 7/2014 | Richter | D15/139 |
| D711,441 S * | 8/2014 | Novak et al. | D15/139 |
| 2002/0037201 A1 | 3/2002 | Despres | |
| 2003/0103822 A1 | 6/2003 | Wirth et al. | |
| 2003/0133765 A1 | 7/2003 | Capriotti | |
| 2003/0146024 A1 * | 8/2003 | Cramer et al. | 175/403 |
| 2003/0177645 A1 | 9/2003 | Flury et al. | |
| 2004/0179911 A1 | 9/2004 | Keightlev | |
| 2005/0031422 A1 | 2/2005 | Tseng | |
| 2005/0105981 A1 | 5/2005 | Byrley et al. | |
| 2007/0020056 A1 | 1/2007 | Burdick | |
| 2007/0059113 A1 | 3/2007 | Capstran | |
| 2007/0160435 A1 | 7/2007 | Chao | |
| 2008/0166195 A1 | 7/2008 | Gentry et al. | |
| 2008/0187405 A1 | 8/2008 | Nordlin | |
| 2009/0035082 A1 | 2/2009 | Singh | |
| 2009/0044674 A1 * | 2/2009 | Neitzell | 83/492 |
| 2009/0216235 A1 | 8/2009 | Ellis | |
| 2009/0222009 A1 | 9/2009 | Ellis | |
| 2009/0279972 A1 | 11/2009 | Novak et al. | |
| 2010/0028098 A1 | 2/2010 | Shaffer | |
| 2010/0034608 A1 | 2/2010 | Nordlin et al. | |
| 2010/0080665 A1 * | 4/2010 | Keightley | 408/204 |
| 2010/0086372 A1 | 4/2010 | Werner | |
| 2010/0092256 A1 | 4/2010 | Khangar et al. | |
| 2010/0145341 A1 | 6/2010 | Ranck et al. | |
| 2010/0278601 A1 | 11/2010 | Beynon | |
| 2011/0038679 A1 | 2/2011 | Kozak | |
| 2011/0052340 A1 | 3/2011 | Kozak | |
| 2011/0073337 A1 | 3/2011 | Milbourne et al. | |
| 2011/0170965 A1 | 7/2011 | Novak et al. | |
| 2011/0170966 A1 | 7/2011 | Novak et al. | |
| 2011/0170967 A1 | 7/2011 | Novak et al. | |
| 2011/0170969 A1 | 7/2011 | Novak et al. | |
| 2011/0170970 A1 | 7/2011 | Kalomeris et al. | |
| 2011/0170971 A1 | 7/2011 | Novak et al. | |
| 2011/0170972 A1 | 7/2011 | Zielonka et al. | |
| 2012/0155979 A1 | 6/2012 | Khangar et al. | |
| 2012/0247834 A1 | 10/2012 | Buxbaum et al. | |
| 2014/0023446 A1 | 1/2014 | Piller et al. | |
| 2014/0158591 A1 | 6/2014 | Green et al. | |
| 2014/0271007 A1 * | 9/2014 | Richter | 408/204 |
| 2015/0239051 A1 | 8/2015 | Novak et al. | |

FOREIGN PATENT DOCUMENTS

| | | | |
|---|---|---|---|
| CN | 201799668 | 4/2011 | |
| DE | 2845123 A1 * | 4/1980 | B23B 51/04 |
| DE | 3214209 | 10/1983 | |
| DE | 29907717 U1 * | 8/1999 | B23B 51/04 |
| DE | 20201300 | 7/2003 | |
| DE | 20318529 | 4/2005 | |
| DE | 102005012026 | 9/2006 | |
| EP | 0612575 | 8/1994 | |
| EP | 0792705 | 9/1997 | |
| EP | 0965407 | 12/1999 | |
| EP | 2070618 A1 * | 6/2009 | B23B 51/04 |
| GB | 911093 | 11/1962 | |
| GB | 1476437 | 6/1977 | |
| GB | 2040741 A * | 9/1980 | B23B 51/04 |
| GB | 1589293 | 5/1981 | |
| GB | 2338438 | 12/1999 | |

(56) References Cited

FOREIGN PATENT DOCUMENTS

| | | | | | |
|---|---|---|---|---|---|
| GB | 2451947 | A | * | 2/2009 | ............ B23B 51/04 |
| JP | 56089414 | A | * | 7/1981 | ............ B23B 51/04 |
| JP | 3019727 | | | 1/1991 | |
| JP | 4171108 | | | 6/1992 | |
| JP | H0525013 | | | 4/1993 | |
| JP | 09192912 | | | 7/1997 | |
| JP | 2003200415 | A | * | 7/2003 | ............... B28D 1/00 |
| JP | 2008018490 | | | 1/2008 | |
| KR | 2012039417 | A | * | 4/2012 | ............ B23B 51/04 |
| NL | 9400753 | A | * | 12/1995 | |
| WO | WO 9015683 | A1 | * | 12/1990 | ............ B23B 51/04 |
| WO | 2008064409 | | | 6/2008 | |
| WO | WO 2011088269 | A1 | * | 7/2011 | ............ B23B 51/04 |

OTHER PUBLICATIONS

Makita Industrial Power Tools, 1998-1999 General Catalog (1998) ISO9002, p. 96.
International Search Report and Written Opinion for Application No. PCT/US2013/051106 dated Sep. 25, 2013 (14 pages).
Inter Partes Review No. 2015-01461, "Petition for Inter Partes Review of U.S. Pat. No. 8,579,554", dated Jun. 22, 2015 (56 pages).
Inter Partes Review No. 2015-01461, "Petitioner Exhibit 1002 Declaration of James Pangerc", dated Jun. 22, 2015 (11 pages).

* cited by examiner

HOLE SAW

CROSS-REFERENCE TO RELATED APPLICATIONS

This application claims priority to U.S. Provisional Patent Application No. 61/673,124, filed Jul. 18, 2012; U.S. Provisional Patent Application No. 61/717,389, filed Oct. 23, 2012; and U.S. Provisional Patent Application No. 61/784,172, filed Mar. 14, 2013, the contents of each of which are incorporated by reference herein.

BACKGROUND

The present invention relates to power tool accessories, and more specifically, to hole saws.

A hole saw is a type of circular saw with a cylindrical, cup-like body that is rotated about a central axis in order to cut a cylindrical plug from a work piece, thereby forming a circular aperture in the work piece. The plug, or core, of the work piece is received within the cup-like body as the hole saw progresses through the work piece. Under certain conditions, the plug can become trapped within the body, necessitating manual removal of the plug by the user.

SUMMARY

In one embodiment, the invention provides a hole saw including a cylindrical body disposed along an axis of rotation with a side wall extending axially from a cap end to a cutting end. The cutting end includes a plurality of cutting teeth. A cap includes a rim portion seated on the cap end and an axially extending portion extending into the cylindrical body from the cap end. The side wall defines an aperture including a first slot portion and a second slot portion disposed closer to the cap end than the first slot portion. A wall of the second slot portion nearest the cap end is between approximately 0.010 inches and approximately 0.120 inches axially offset from the axially extending portion of the cap.

In another embodiment the invention provides a hole saw. A cylindrical body is disposed along an axis of rotation and includes a side wall extending axially from a cap end to a cutting end. The cutting end includes a plurality of cutting teeth. A cap includes a rim portion seated on the cap end and an axially extending portion extending into the cylindrical body from the cap end. The side wall defines an aperture including a first slot portion oriented substantially perpendicular to the axis and a second slot portion disposed closer to the cap end than the first slot portion. A wall of the second slot portion nearest the cap end is between approximately 0.010 inches and approximately 0.120 inches axially offset from the axially extending portion of the cap. A connecting slot portion connects the first slot portion and the second slot portion.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-18 illustrate a power tool accessory, such as, for example, a hole-saw, for operation with a power tool (e.g., a drill, a driver-drill, a screwdriver, and the like). In some embodiments, the power tool accessory is operable to cut holes of different sizes in a work piece and/or to remove plugs from the work piece. Each of the embodiments of the invention described below includes a cylindrical body defining at least one slot or aperture (e.g., a pair of slots or apertures). Hole saws including any number (e.g., one, two, three, or more) of the disclosed slots or apertures, and variations thereof, are within the scope of the invention.

Figure 1:
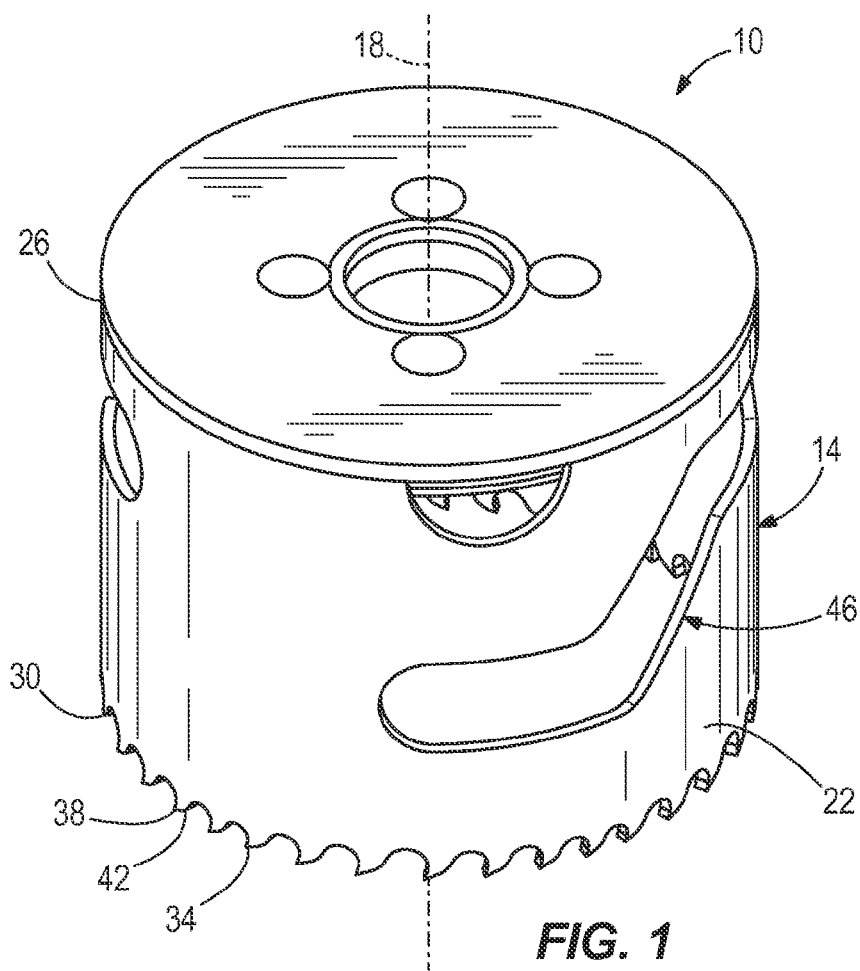
FIG. 1 is a perspective view of a hole saw according to a first embodiment of the invention.

FIGS. 1-4 illustrates an embodiment of a power tool accessory, and more specifically, a hole saw 10. The hole saw 10 includes a cylindrical body 14 disposed along an axis of rotation 18. The cylindrical body 14 is defined by a side wall 22 that extends between a cap end 26 and a cutting end 30. As shown in FIG. 1, the cutting end 30 includes cutting teeth 34. Each of the teeth 34 is defined by a leading edge 38 and a trailing edge 42.

Figure 3:
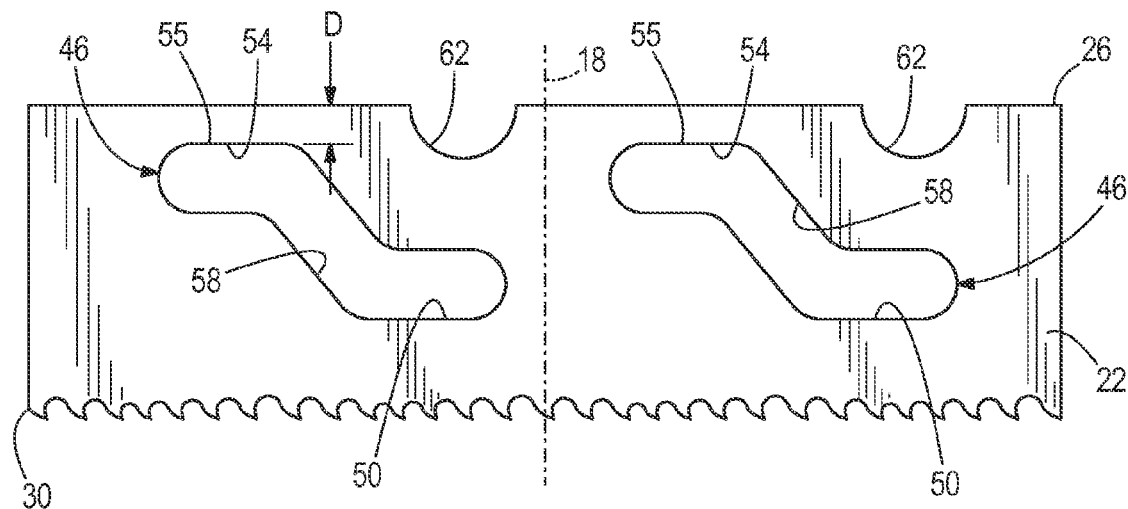
FIG. 3 is a planar view of a cylindrical body of the hole saw of FIG. 1.

As shown in FIG. 3, elongated apertures 46 are defined within the side wall 22. Each elongated aperture 46 is defined by a first slot portion 50 and a second slot portion 54, each orientated substantially perpendicular to the axis 18. The first slot portion 50 is axially disposed closer to the cutting end 30, and the second slot portion 54 is disposed closer to the cap end 26. The first slot portion 50 is offset relative to the second slot portion 54. A connecting slot portion 58 connects the first slot portion 50 and the second slot portion 54. The connecting slot portion 58 is at an angle relative to the cap end 26 and the cutting end 30. The first slot portion 50, the second slot portion 54, and the connecting slot portion 58 all have substantially the same width, though in other embodiments they may have different widths. The second slot portion 54 includes an upper wall 55 that is substantially parallel to the cap end 26 and is located at a maximum distance D of approximately 0.2 inches from the cap end 26. Alternatively, the upper wall 55 of the second slot portion 54 may be flush with the cap end 26 such that distance D is zero, or the second slot portion 54 may extend through a cap (not shown). The apertures 46 are configured to receive a tool (not shown) for removing plugs from within the cylindrical body 14.

As illustrated in FIG. 3, the cap end 26 defines semi-circular slots 62 configured to receive a plug-removing tool (not shown).

Figure 2:
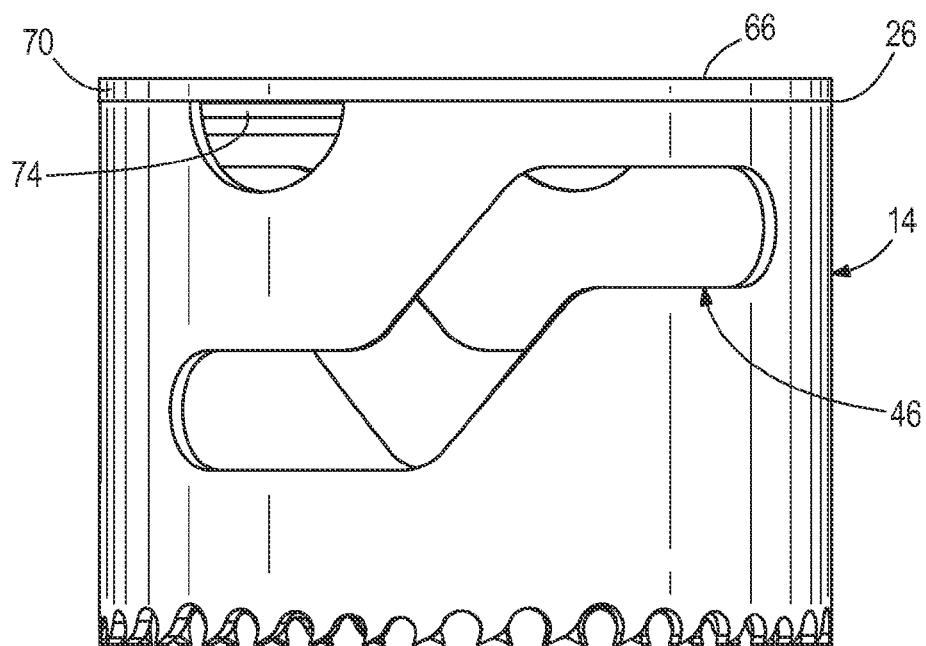
FIG. 2 is a side view of the hole saw of FIG. 1.
Figure 4:
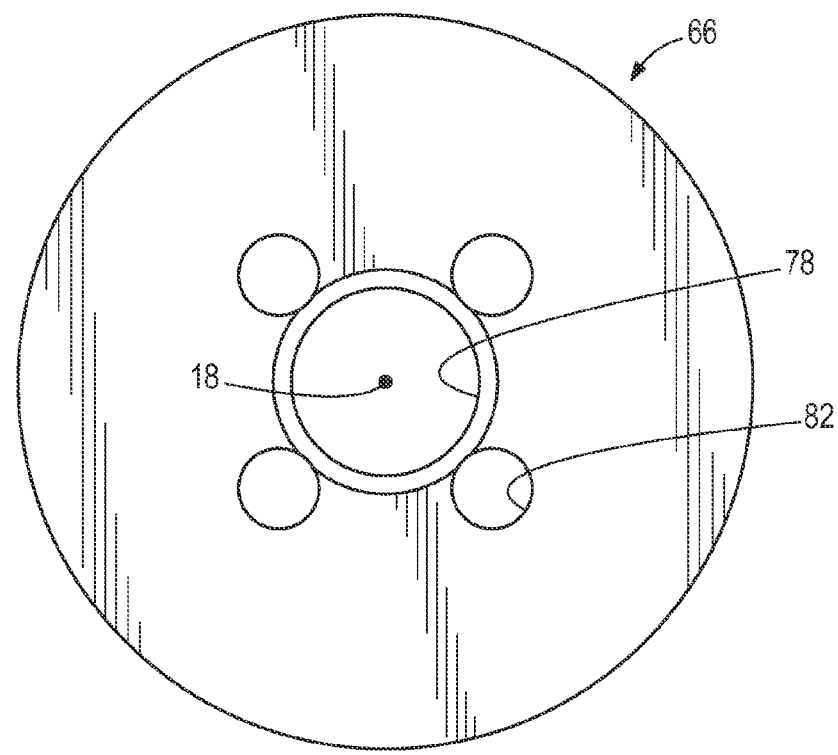
FIG. 4 is a top view of the hole saw of FIG. 1.

Referring to FIG. 2, a cap 66 is coupled to the cap end 26 of the cylindrical body 14. The cap 66 has substantially the same diameter as the cylindrical body 14 and is welded to the cap end 26 with a substantially continuous weld between the semi-circular slots 62. The cap 66 includes a rim portion 70 that seats on the cap end 26 and an axially extending portion 74 that extends into the cap end 26 of the cylindrical body. The rim portion 70 is substantially perpendicular to the axially extending portion 74. As shown in FIG. 4, the cap 66 defines a main aperture 78 centered about the axis 18 and configured to receive a mandrel or equivalent tool (not shown). A plurality of holes 82 are defined in the cap 66 and surround the main aperture 78. The plurality of holes 82 are circumferentially arranged about the axis 18.

Figure 5:
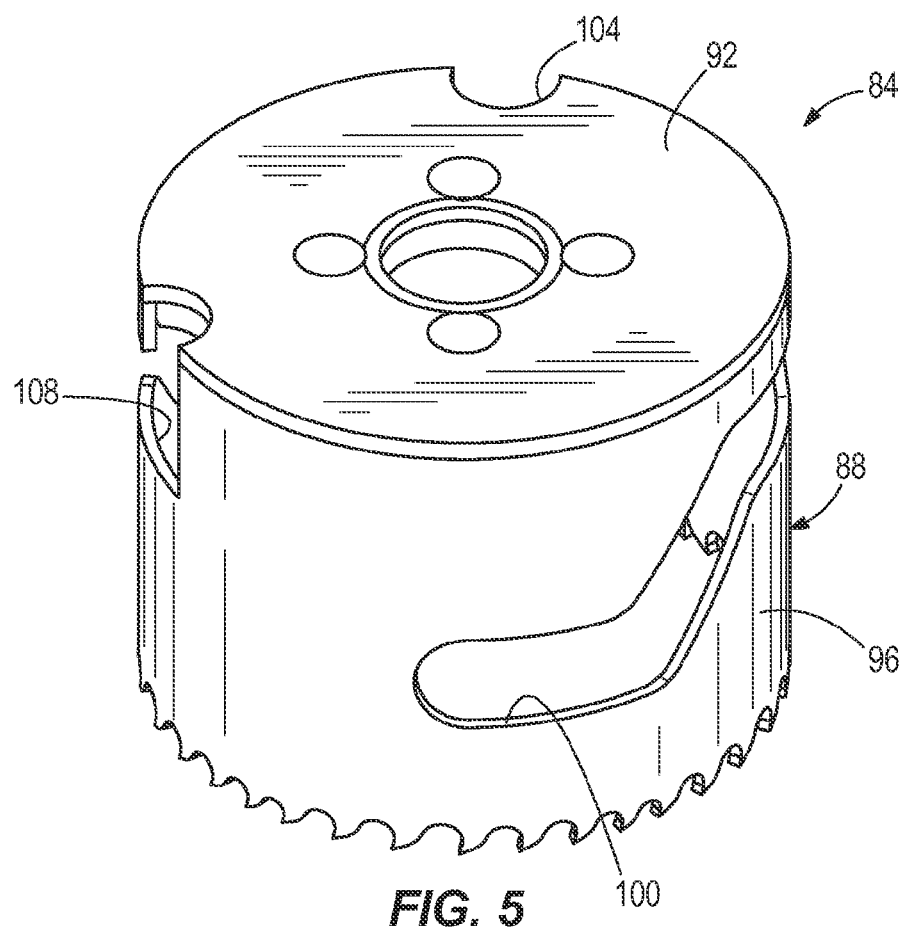
FIG. 5 is a perspective view of a hole saw according to another embodiment of the invention.

FIGS. 5-9 illustrate another embodiment of a hole saw 84. The hole saw 84 has substantial similarities to the hole saw 10 described with respect to FIGS. 1-4, and only those aspects that differ from the embodiments of FIGS. 1-4 will be described herein. Referring to FIG. 5, the hole saw 84 includes a cylindrical body 88 and a cap 92. The cylindrical body 88 includes a side wall 96 having a first aperture 100, a second aperture 104, and a third aperture 108. The apertures 100, 104, 108 are configured to receive a tool (not shown) for removing the plugs from within the cylindrical body 88.

Figure 6:
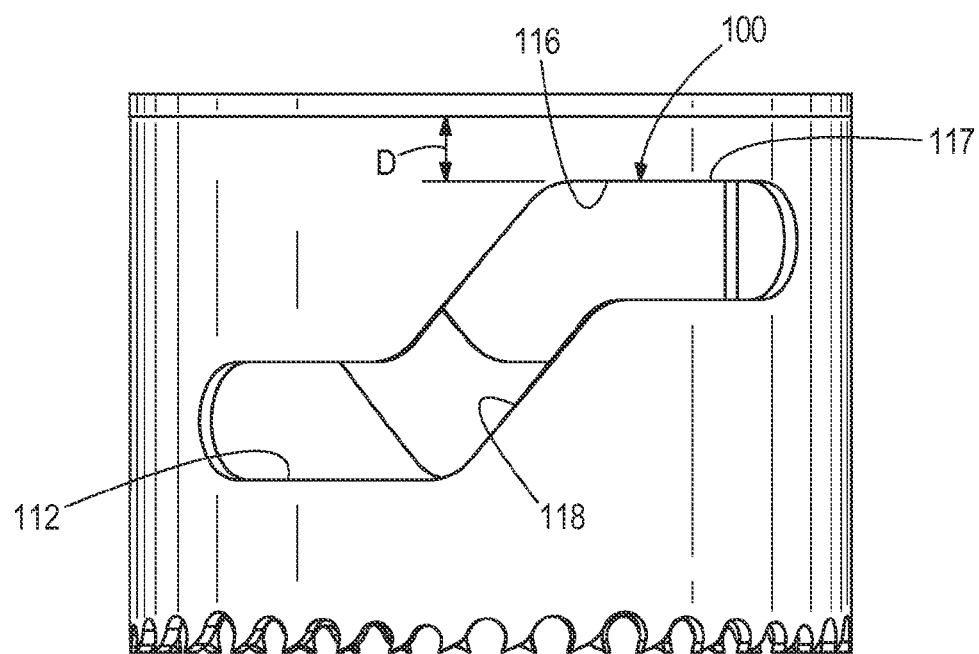
FIG. 6 is a side view of a first aperture of the hole saw of FIG. 5.

As shown in FIG. 6, the first aperture 100 is defined by a first slot portion 112 and a second slot portion 116. The first slot portion 112 and the second slot portion 116 are each orientated substantially perpendicular to the axis 18. A connecting slot portion 118 connects the first slot portion 112 and the second slot portion 116. The second slot portion 116 includes an upper wall 117 that is substantially parallel to the cap end 92 and is located at a maximum distance D of approximately 0.2 inches from the cap end 92. Alternatively, the upper wall 117 of the second slot portion 116 may be flush with the cap end 92 such that distance D is zero, or the second slot portion 116 may extend through the cap 92 (FIG. 5).

Figure 7:
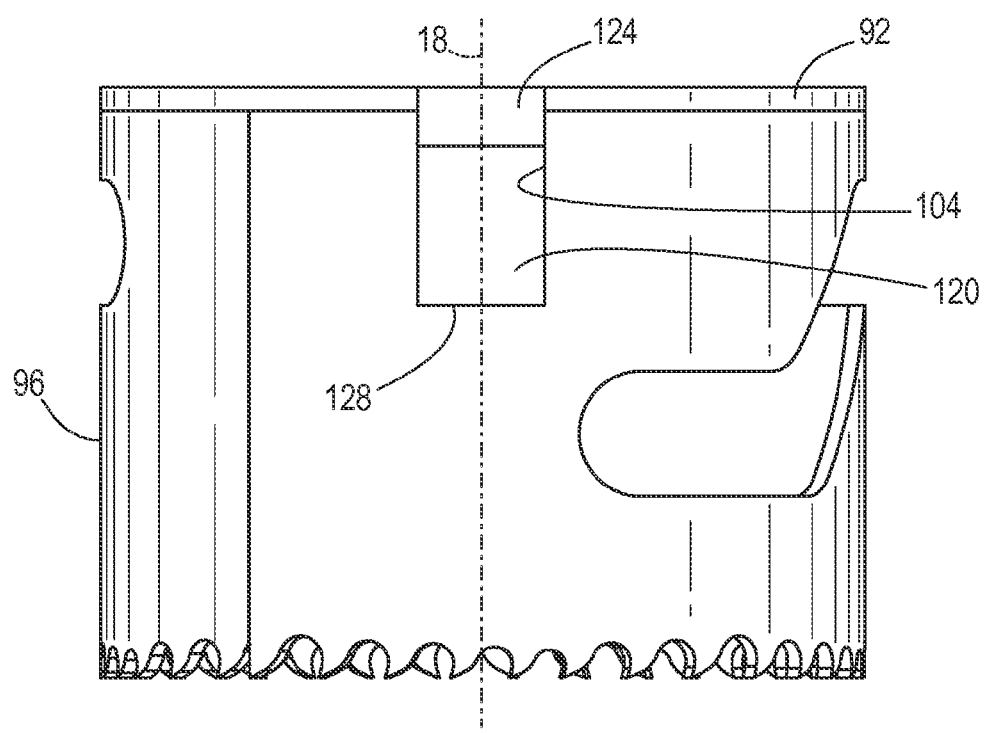
FIG. 7 is a side view of a second aperture of the hole saw of FIG. 5.
Figure 8:
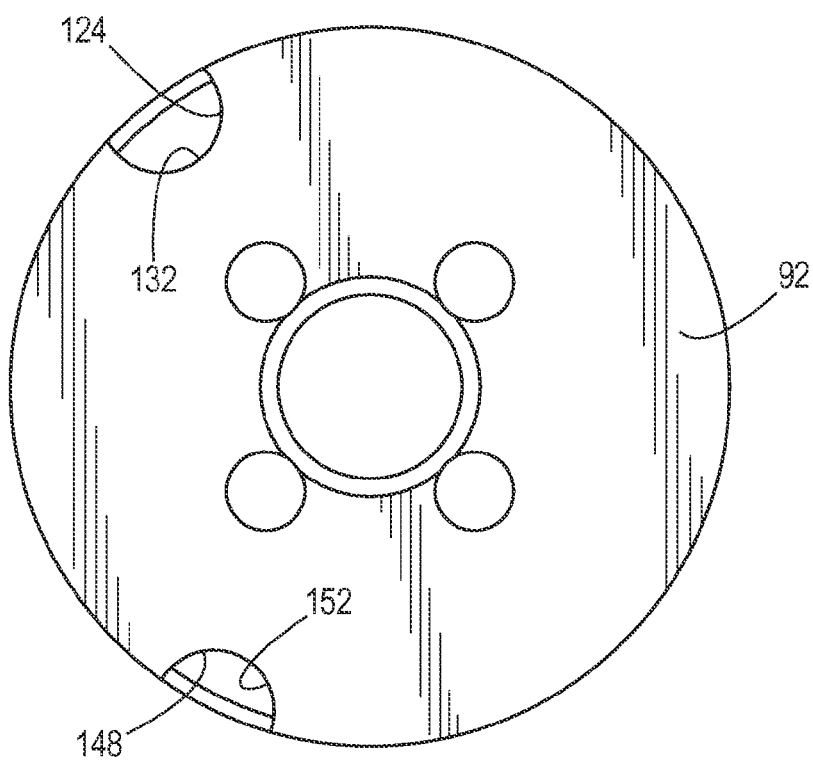
FIG. 8 is a top view of the hole saw of FIG. 5.

As shown in FIG. 7, the second aperture 104 is defined by a sidewall portion 120 and a cap portion 124. The sidewall portion 120 extends through the side wall 96 and terminates at an edge 128 that is substantially perpendicular to the axis 18. The cap portion 124 extends through the cap 92 and terminates at a semi-circular edge 132 as shown in FIG. 8.

Figure 9:
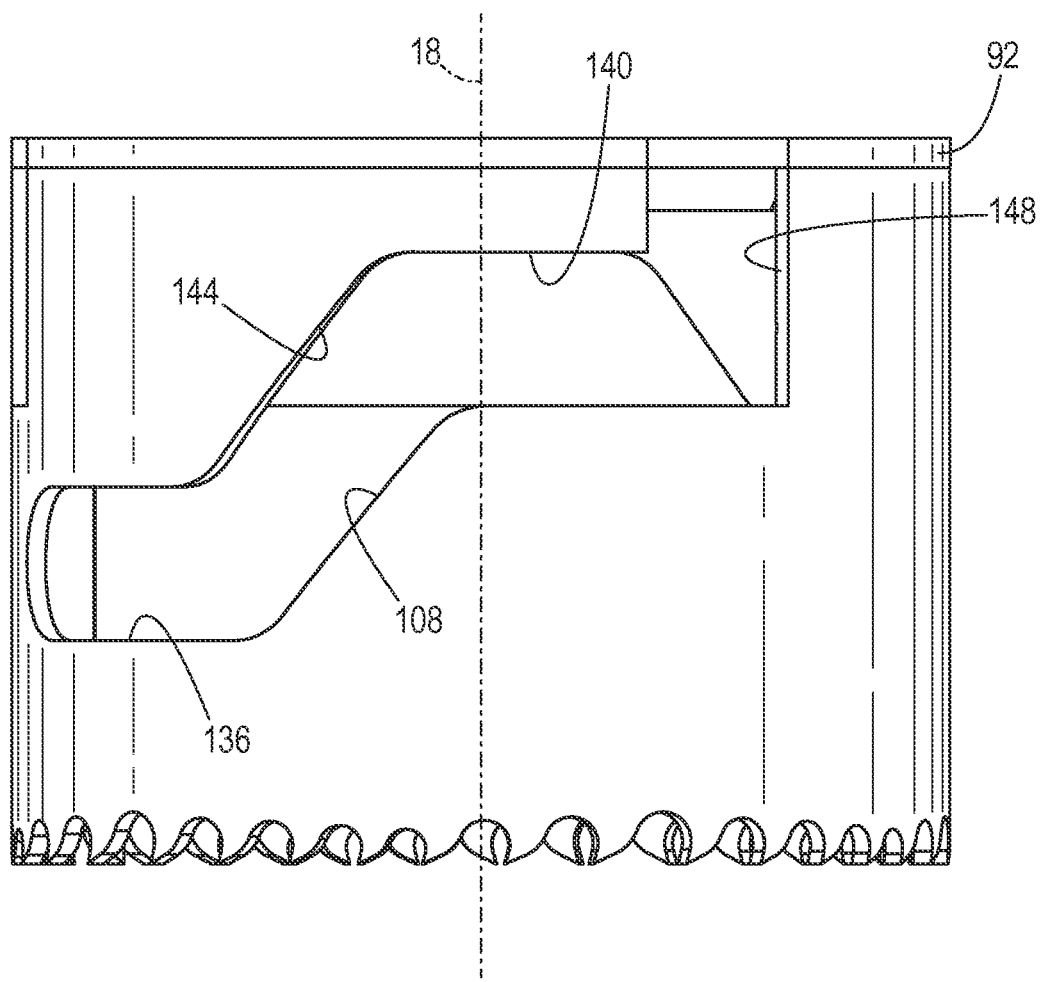
FIG. 9 is a side view of a third aperture of the hole saw of FIG. 5.

Referring to FIG. 9, the third aperture 108 includes a first slot portion 136, a second slot portion 140, a connecting slot portion 144, and a vertical slot portion 148. The first slot portion 136 and the second slot portion 140 are each oriented substantially perpendicular to the axis 18 and are connected by the connecting slot portion 144. The vertical slot portion 148 extends from the second slot portion 140 through the cap 92 and terminates at a semi-circular edge 152 within the cap 92 as shown in FIG. 8.

The cap 92 is welded to the body 88, with a substantially continuous welds interrupted by the cap portion 124 of the second aperture 104 and the vertical slot portion 148 of the third aperture.

Figure 10:
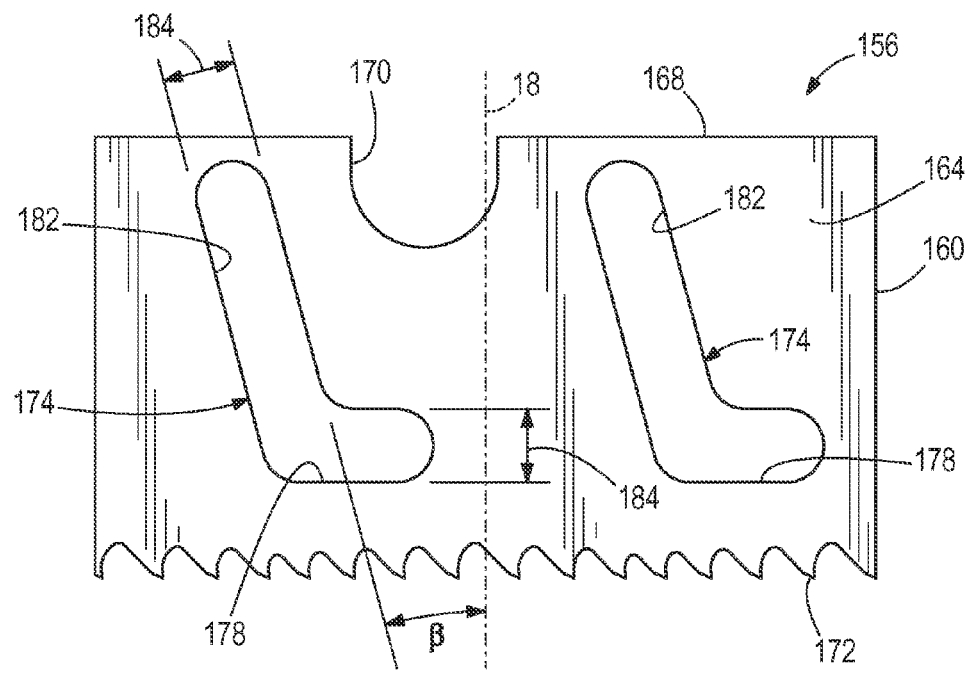
FIG. 10 is a planar view of a cylindrical body of a hole saw according to another embodiment of the invention.

FIG. 10 illustrates yet another embodiment of a hole saw 156. The hole saw 156 has substantial similarities to the hole saw 10 described with respect to FIGS. 1-4, and only those aspects that differ from the embodiments of FIGS. 1-4 will be described herein.

Referring to FIG. 10, the hole saw 156 includes a cylindrical body 160 having a side wall 164 extending between a cap end 168 and a cutting end 172. The cap end 168 defines a semi-circular slot 170 configured to receive a plug-removing tool (not shown).

A pair of elongated apertures 174 are defined within the side wall 164. Each aperture 174 is configured to receive a tool (not shown) for removing work piece plugs from within the cylindrical body 160. Each elongated aperture 174 is defined by a first slot portion 178 and a second slot portion 182. The first slot portion 178 is oriented substantially perpendicular to the axis 18. The second slot portion 182 connects to the first slot portion 178 and is oriented at an angle β relative to the axis 18. In the illustrated embodiment, the angle β is between approximately 14.5 degrees and approximately 15.5 degrees, but other embodiments may include other orientations. The first slot portion 178 and the second slot portion 182 have substantially the same width 184.

Figure 11:
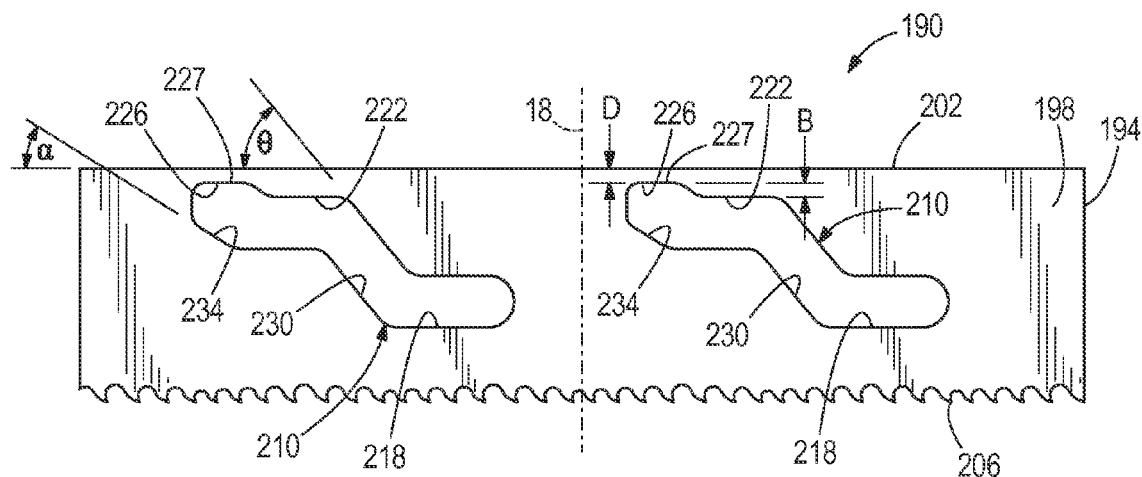
FIG. 11 is a planar view of a cylindrical body of a hole saw according to another embodiment of the invention.

FIG. 11 illustrates yet another embodiment of a hole saw 190. The hole saw 190 has substantial similarities to the hole saw 10 described with respect to FIGS. 1-4, and only those aspects that differ from the embodiments of FIGS. 1-4 will be described herein.

As shown in FIG. 11, the hole saw 190 includes a cylindrical body 194 having a side wall 198 extending between a cap end 202 and a cutting end 206. A pair of elongated apertures 210 are defined within the side wall 198. The elongated apertures 210 are configured to receive a tool (not shown) for removing plugs from within the cylindrical body 194. Each elongated aperture 210 is defined by a first slot portion 218, a second slot portion 222, and a third slot portion 226, each oriented substantially perpendicular to the axis 18. The first slot portion 218 is disposed closer to the cutting end 206, and the third slot portion 226 is disposed closer to the cap end 202. The second slot portion 222 is disposed between the first slot portion 218 and the third slot portion 226. The third slot portion 226 includes an upper wall 227 that is substantially parallel to the cap end 202. The upper wall 227 is offset a distance B from the second slot portion 222. In the illustrated embodiment, distance B is between less than half of an axial height of the aperture 210. The upper wall 227 is located at a maximum distance D of approximately 0.2 inches from the cap end 202. Alternatively, the upper wall 227 of the third slot portion 226 may be flush with the cap end 202 such that distance D is zero, or the third slot portion 226 may extend through a cap (not shown) coupled to the cap end 202.

A first connecting slot portion 230 connects the first slot portion 218 and the second slot portion 222. The first connecting slot portion 230 is oriented an angle θ relative to the cap end 202 and the cutting end 206. In the illustrated embodiment, the angle θ is between approximately 50.2 degrees and approximately 51.2 degrees, but other embodiments may include other orientations.

A second connecting slot portion 234 connects the second slot portion 222 and the third slot portion 226. The second connecting slot portion 234 is oriented at an angle α relative to the cap end 202 and the cutting end 206. In the illustrated embodiment, the angle α is between approximately 31.3 degrees and approximately 32.3 degrees, but other embodiments may include other angle ranges.

Figure 12:
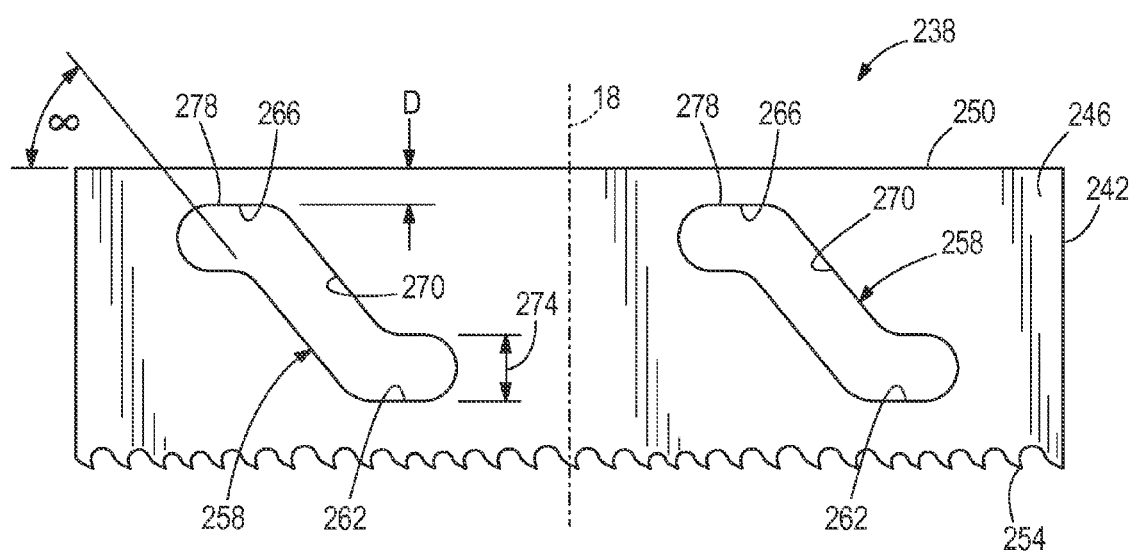
FIG. 12 is a planar view of a cylindrical body of a hole saw according to another embodiment of the invention.

FIG. 12 illustrates yet another embodiment of a hole saw 238. The hole saw 238 has substantial similarities to the hole saw 10 described with respect to FIGS. 1-4, and only those aspects that differ from the embodiments of FIGS. 1-4 will be described herein.

As shown in FIG. 12, the hole saw 238 includes a cylindrical body 242 having a side wall 246 extending between a cap end 250 and a cutting end 254. A pair of elongated apertures 258 are defined within the side wall 246. Each elongated aperture 258 is defined by a first slot portion 262 and a second slot portion 266, each orientated substantially perpendicular to the axis 18. The first slot portion 262 is circumferentially disposed closer to the cutting end 254, and the second slot portion 266 is disposed closer to the cap end 250, whereby the first slot portion 262 is offset relative to the second slot portion 266. A connecting slot portion 270 connects the first slot portion 262 and the second slot portion 266. The connecting slot portion 270 is oriented at an angle ∞ relative to the cap end 250 and the cutting end 254. In the illustrated embodiment, the angle ∞ is between approximately 50.3 degrees and approximately 51.3 degrees, but other embodiments may include other angle ranges. The first slot portion 262, the second slot portion 266, and the connecting slot portion 270 all have substantially the same width 274. The second slot portion 266 includes an upper wall 278 that is substantially parallel to the cap end 250 and is located at a maximum distance D of approximately 0.2 inches from the cap end 250. Alternatively, the upper wall 278 of the second slot portion 266 may be oriented flush with the cap end 250 such that distance D is zero, or the second slot portion 266 may extend through a cap (not shown) coupled to the cap end 250. The apertures 258 are configured to receive a tool (not shown) for removing plugs from within the cylindrical body 242.

Figure 13:
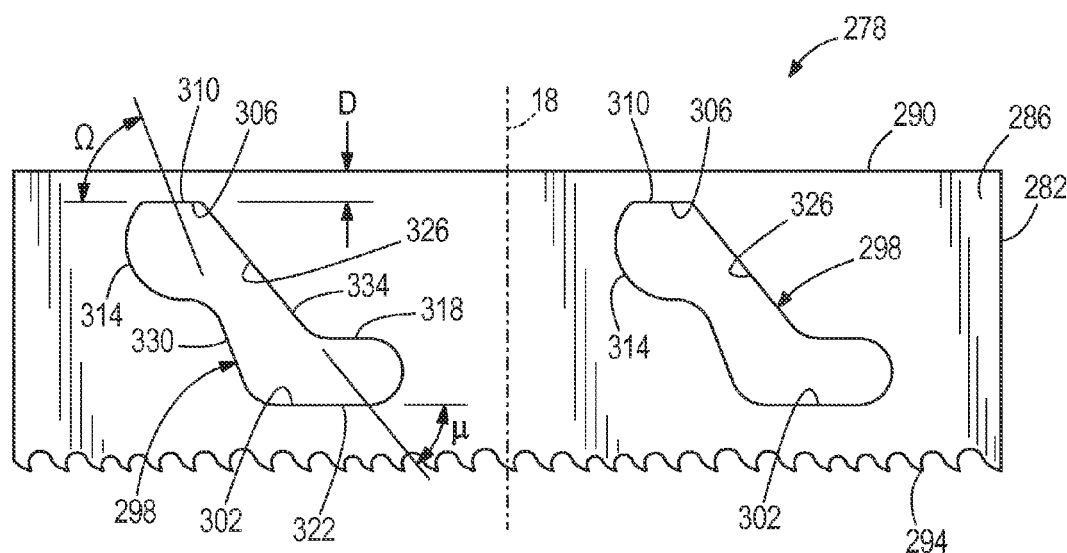
FIG. 13 is a planar view of a cylindrical body of a hole saw according to another embodiment of the invention.

FIG. 13 illustrates yet another embodiment of a hole saw 278. The hole saw 278 has substantial similarities to the hole saw 10 described with respect to FIGS. 1-4, and only those aspects that differ from the embodiments of FIGS. 1-4 will be described herein.

As shown in FIG. 13, the hole saw 278 includes a cylindrical body 282 having a side wall 286 extending between a cap end 290 and a cutting end 294. A pair of elongated apertures 298 are defined within the side wall 286. Each elongated aperture 298 is defined by a first slot portion 302 and a second slot portion 306. The first slot portion 302 is disposed closer to the cutting end 294, and the second slot portion 306 is disposed closer to the cap end 290. The second slot portion 306 includes an upper wall 310 orientated substantially parallel to the cap end 290, and a radial wall 314 extends from the upper wall 310. The upper wall 310 is located at a maximum distance D of approximately 0.2 inches from the cap end 290. Alternatively, the upper wall 310 of the second slot portion 306 may be oriented flush with the cap end 290 such that distance D is zero, or the second slot portion 306 may extend through a cap (not shown) coupled to the cap end 290.

Referring to FIG. 13, the first slot portion 302 includes an upper wall 318 and a lower wall 322, each oriented substantially perpendicular to the axis 18. A connecting slot portion 326 connects the first slot portion 302 and the second slot portion 306 and includes a first wall 330 and a second wall 334. The radial wall 314 connects to the first wall 330, which connects to the lower wall 322. The second wall 334 extends between the upper wall 310 and the upper wall 318. The first wall 330 is oriented at an angle Ω relative to the cap end 290 and the cutting end 294. In the illustrated embodiment, the angle Ω is between approximately 69.5 degrees and approximately 70.5 degrees, but other embodiments may include other angle ranges. The second wall 334 is oriented at an angle μ relative to the cap end 290 and the cutting end 294. In the illustrated embodiment, the angle μ is between approximately 50.1 degrees and approximately 51.1 degrees, but other embodiments may include other angle ranges.

Figure 14:
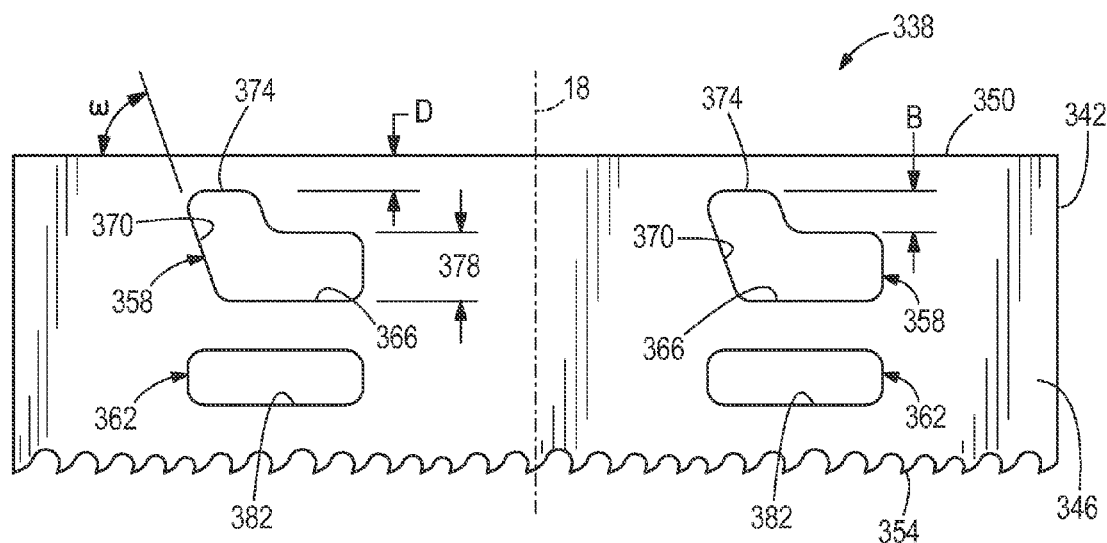
FIG. 14 is a planar view of a cylindrical body of a hole saw according to another embodiment of the invention.

FIG. 14 illustrates yet another embodiment of a hole saw 338. The hole saw 338 has substantial similarities to the hole saws 10 and 156 described with respect to FIGS. 1-4 and 10, and only those aspects that differ from the embodiments of FIGS. 1-4 and 10 will be described herein.

As shown in FIG. 14, the hole saw 338 includes a cylindrical body 342 having a side wall 346 extending between a cap end 350 and a cutting end 354. The side wall 346 includes a first pair of elongated apertures 358 and a second pair of elongated apertures 362. The first pair of elongated apertures 358 are disposed closer to the cap end 350, and the second pair of elongated apertures 362 are disposed closer to the cutting end 354. Each of the first pair of apertures 358 includes a first slot portion 366 and second slot portion 370.

The first slot portion 366 is oriented substantially perpendicular to the axis 18. The second slot portion 370 extends from the first slot portion 366 and is oriented at an angle ω relative to the cap end 350 and the cutting end 354. In the illustrated embodiment, the angle ω is between approximately 69.5 degrees and approximately 70.5 degrees, but other embodiments may include other angle ranges. The second slot portion 370 includes an upper wall 374 that is substantially parallel to the cap end 350. The upper wall 374 is offset a distance B from the lower slot portion 366. In the illustrated embodiment, distance B is less than half of an axial height of the aperture 358. The upper wall 374 is located at a maximum distance D of approximately 0.2 inches from the cap end 350. Alternatively, the upper wall 374 of the second slot portion 370 may be flush with the cap end 350 such that distance D is zero, or the second slot portion 370 may extend through a cap (not shown) coupled to the cap end 350. The first slot portion 366 and the second slot portion 370 have substantially the same width 378.

Each of the second pair of apertures 362 is defined by a first slot portion 382 oriented substantially perpendicular to the axis 18. The first pair of apertures 358 and the second pair of apertures 362 are generally aligned in the same position and orientation relative to the axis 18, though in other embodiments they may be staggered or in other orientations.

Figure 15:
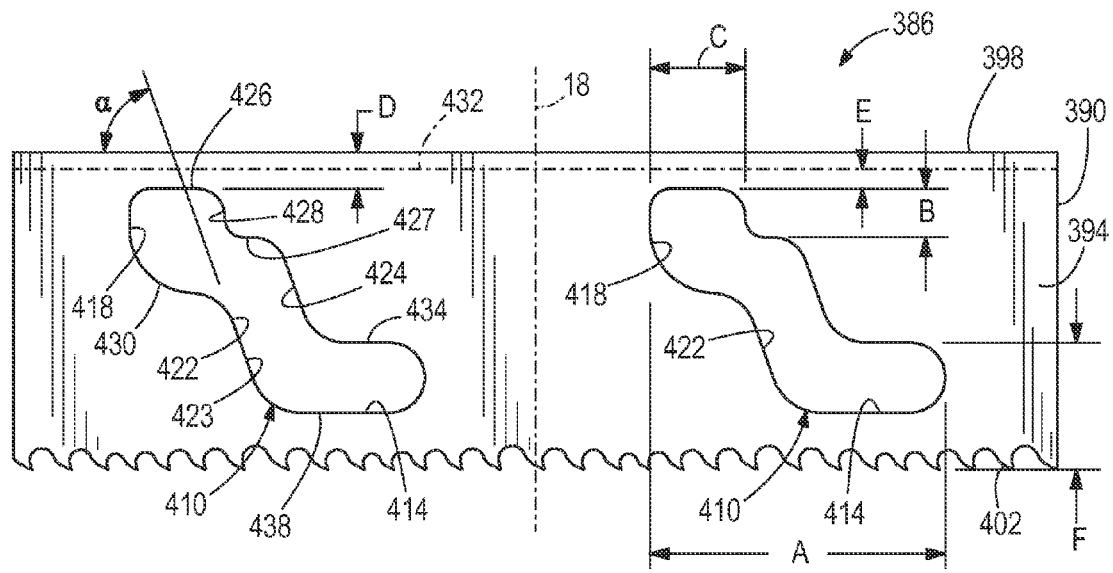
FIG. 15 is a planar view of a cylindrical body of a hole saw according to another embodiment of the invention.

FIG. 15 illustrates yet another embodiment of a hole saw 386. The hole saw 386 has substantial similarities to the hole saw 10 described with respect to FIGS. 1-4, and only those aspects that differ from the embodiments of FIGS. 1-4 will be described herein.

As shown in FIG. 15, the hole saw 386 includes a cylindrical body 390 having a side wall 394 extending between a cap end 398 and a cutting end 402. A pair of elongated apertures 410 are defined within the side wall 394. Each elongated aperture 410 is defined by a first slot portion 414 and a second slot portion 418, each orientated substantially perpendicular to the axis 18. The first slot portion 414 is disposed closer to the cutting end 402, and the second slot portion 418 is disposed closer to the cap end 398. A connecting slot portion 422 connects the first slot portion 414 and the second slot portion 418 and is oriented at an angle α relative to the cap end 398 and the cutting end 402. In the illustrated embodiment, the angle α is between approximately 60 degrees and approximately 80 degrees, more specifically approximately 70 degrees, but other embodiments may include other angles. The connecting slot portion 422 includes a first wall 423 and second wall 424. The elongated aperture 410 has a circumferential width A, measured in a direction parallel to the cap end 398 and cutting end 402. In the illustrated embodiment, the circumferential width A is between approximately 1.250 inches and approximately 2.150 inches, more specifically between approximately 1.475 inches and approximately 1.925 inches, and even more specifically, approximately 1.700 inches. A circumferential width A within these ranges provides for greater access to a user when removing a work piece plug from the hole saw 386.

The second slot portion 418 includes an upper wall 426 orientated substantially perpendicular to the axis 18, a lower wall 427 oriented substantially perpendicular to the axis 18, a side wall 428, and a radial wall 430 that extends from the upper wall 426. The radial wall 430 connects to the first wall 423, which connects to the lower wall 438. The second wall 424 connects to the lower wall 427, which connects to the side wall 428. The upper wall 426 and lower wall 427 are axially separated by a slot height B. In the illustrated embodiment, the slot height B is between approximately 0.018 inches and approximately 0.038 inches, more specifically approximately 0.028 inches. Having slot height B within this range of values provides for optimal removal of deep work piece plugs within the hole saw 386.

A slot width C of the second slot portion 418, measured in a direction parallel to the cap end 398, is between approximately 0.305 inches and approximately 0.805 inches, more specifically, between approximately 0.430 inches and approximately 0.680 inches, and even more specifically, approximately 0.555 inches. A slot width C within these ranges of values allows for a greater range of tools to be inserted into the slot in order to remove a work piece plug. The upper wall 426 is located at a maximum distance D of approximately 0.2 inches from the cap end 398. The upper wall 426 is located an axial offset E from a depth 432 of an axially extending portion of a cap (e.g., the axially extending portion 74 of the cap 66 described with respect to FIG. 2). In the illustrated embodiment, the axial offset E is between approximately 0.051 inches and approximately 0.126 inches, more specifically between approximately 0.072 inches and approximately 0.108 inches, and even more specifically, approximately 0.090 inches. Having an axial offset E within this range of values provides for easier removal of deep work piece plugs from within hole saw 386. Alternatively, the upper wall 426 of the second slot portion 418 may be oriented flush with the cap end 398 such that distance D is zero, or the second slot portion 418 may extend through a cap (not shown) coupled to the cap end 398.

The first slot portion 414 includes an upper wall 434 and a lower wall 438, each oriented substantially perpendicular to the axis 18. The upper wall 434 is disposed a distance F from the cutting end 402. In the illustrated embodiment, distance F is between approximately 0.541 inches and approximately 0.895 inches, more specifically between approximately 0.627 inches and approximately 0.809 inches, and even more specifically, approximately 0.718 inches. Having distance F within this range of values allows a user to apply more axially-aligned force when removing a plug from the hole saw 386. Each aperture 410 is configured to receive a tool (not shown) for removing work piece plugs from within the cylindrical body 390.

Figure 16:
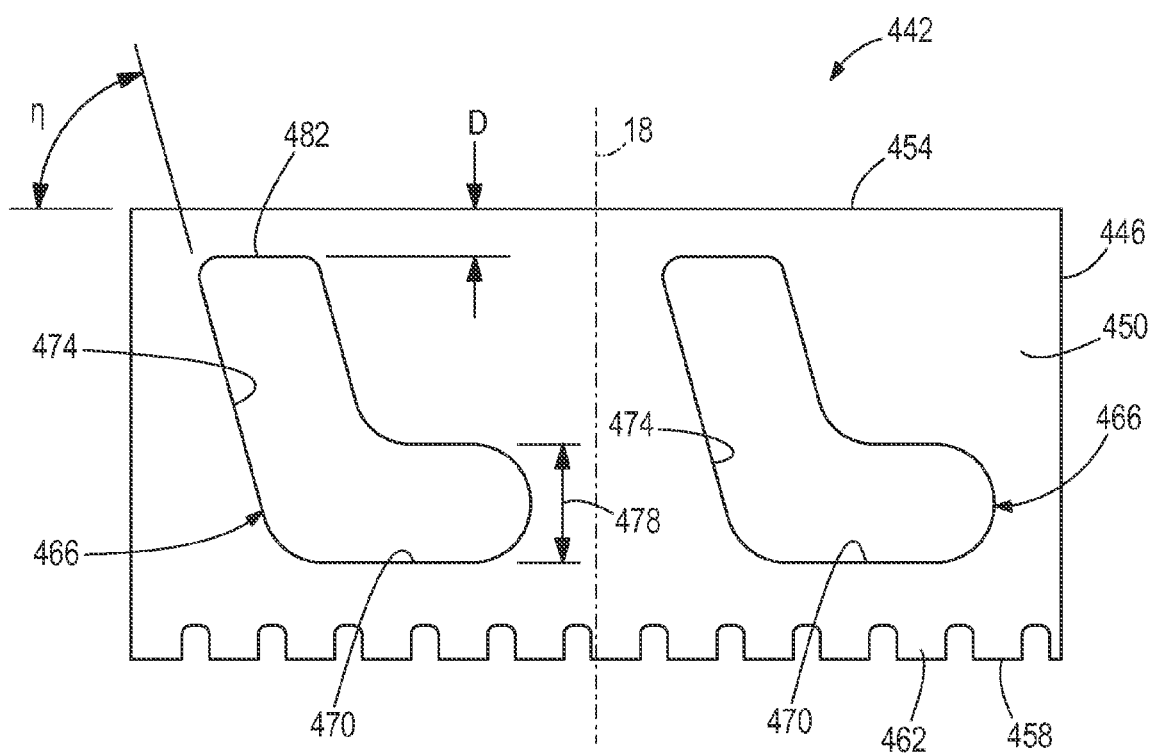
FIG. 16 is a planar view of a cylindrical body of a hole saw according to another embodiment of the invention.

FIG. 16 illustrates yet another embodiment of a hole saw 442. The hole saw 442 has substantial similarities to the hole saw 10, 156, and 338 described with respect to FIGS. 1-4, 10, and 14, and only those aspects that differ from the embodiments of FIGS. 1-4, 10, and 14 will be described herein.

As shown in FIG. 16, the hole saw 442 includes a cylindrical body 446 having a side wall 450 extending between a cap end 454 and a cutting end 458. The cutting end 458 includes a plurality of cutting teeth 462. The plurality of cutting teeth 462 may be coated with an abrasive coating, e.g., diamond grit.

Elongated apertures 466 are defined within the side wall 450. Each elongated aperture 466 is defined by a first slot portion 470 and a second slot portion 474. The first slot portion 470 is oriented substantially perpendicular to the axis 18. The second slot portion 474 connects to the first slot portion 470 and is oriented at an angle η relative to the cap end 454 and the cutting end 458. In the illustrated embodiment, the angle η is between approximately 73.5 degrees and approximately 74.5 degrees, but other embodiments may include other ranges. The first slot portion 470 and the second slot portion 474 have substantially the same width 478. The second slot portion 474 includes an upper wall 482 that is substantially parallel to the cap end 454 and is located at a maximum distance D of approximately 0.2 inches from the cap end 454. Alternatively, the upper wall 482 of the second slot portion 474 may be oriented flush with the cap end 454 such that distance D is zero, or the second slot portion 474 may extend through a cap (not shown) coupled to the cap end 454. Each aperture 466 is configured to receive a tool (not shown) for removing work piece plugs from within the cylindrical body 446.

Figure 17:
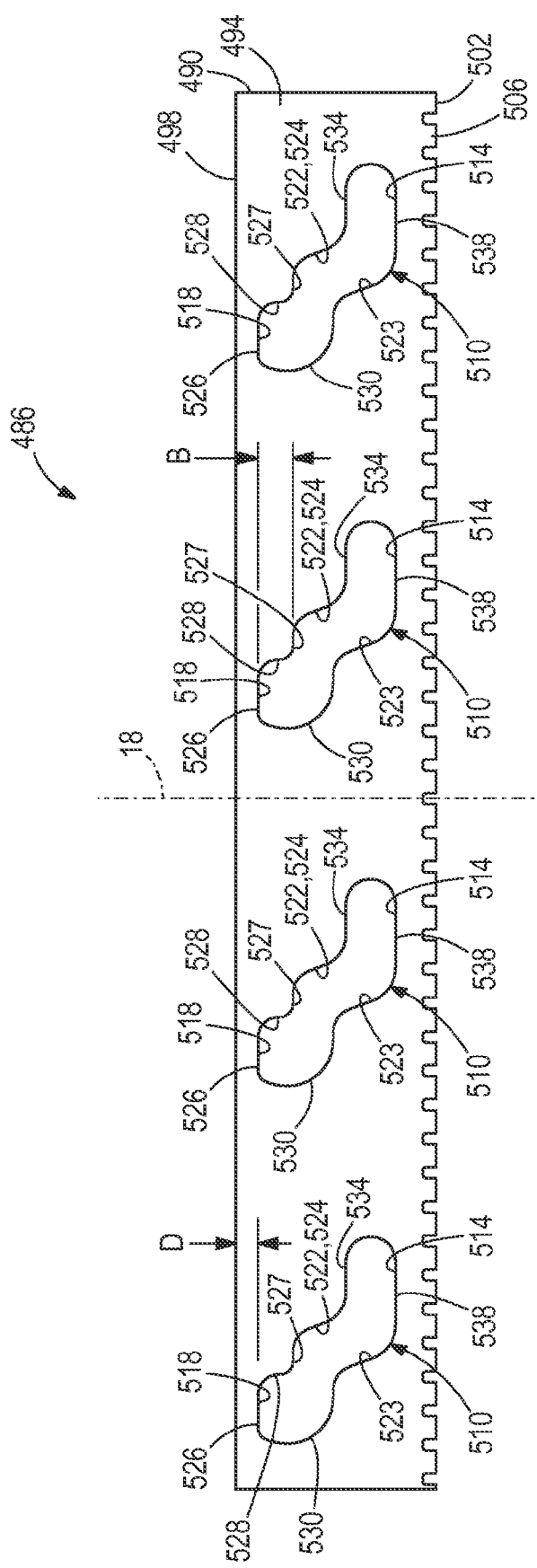
FIG. 17 is a planar view of a cylindrical body of a hole saw according to another embodiment of the invention.

FIG. 17 illustrates yet another embodiment of a hole saw 486. The hole saw 486 has substantial similarities to the hole saws 10 and 386 described with respect to FIGS. 1-4 and 15, and only those aspects that differ from the embodiments of FIGS. 1-4 and 15 will be described herein.

As shown in FIG. 17, the hole saw 486 includes a cylindrical body 490 having a side wall 494 extending between a cap end 498 and a cutting end 502. The cutting end 502 includes a plurality of cutting teeth 506. The plurality of cutting teeth 506 may be coated with an abrasive coating, e.g., diamond grit.

The side wall 494 defines a plurality of elongated apertures 510. Each elongated aperture 510 is defined by a first slot portion 514 and a second slot portion 518, each orientated substantially perpendicular to the axis 18. The first slot portion 514 is disposed closer to the cutting end 502, and the second slot portion 518 is disposed closer to the cap end 498. A connecting slot portion 522 connects the first slot portion 514 and the second slot portion 518 and is oriented at an acute angle relative to the cap end 498 and the cutting end 502. The connecting slot portion includes a first wall 523 and second wall 524.

The second slot portion 518 includes an upper wall 526 orientated substantially perpendicular to the axis 18, a lower wall 527 oriented substantially perpendicular to the axis 18, a side wall 528, and a radial wall 530 that extends from the upper wall 526. A distance B defined between the upper wall 526 and the lower wall 527 is less than half of an axial height of the aperture 510. The upper wall 526 is located at a maximum distance D of approximately 0.2 inches from the cap end 498. Alternatively, the upper wall 526 of the second slot portion 518 may be oriented flush with the cap end 498 such that distance D is zero, or the second slot portion 518 may extend through a cap (not shown) coupled to the cap end 498. The first slot portion 514 includes an upper wall 534 and a lower wall 538, each oriented substantially perpendicular to the axis 18. The radial wall 530 connects to the first wall 523, which connects to the lower wall 538. The second wall 524 connects to the lower wall 527, which connects to the side wall 528. Each aperture 510 is configured to receive a tool (not shown) for removing work piece plugs from within the cylindrical body 490.

Figure 18:
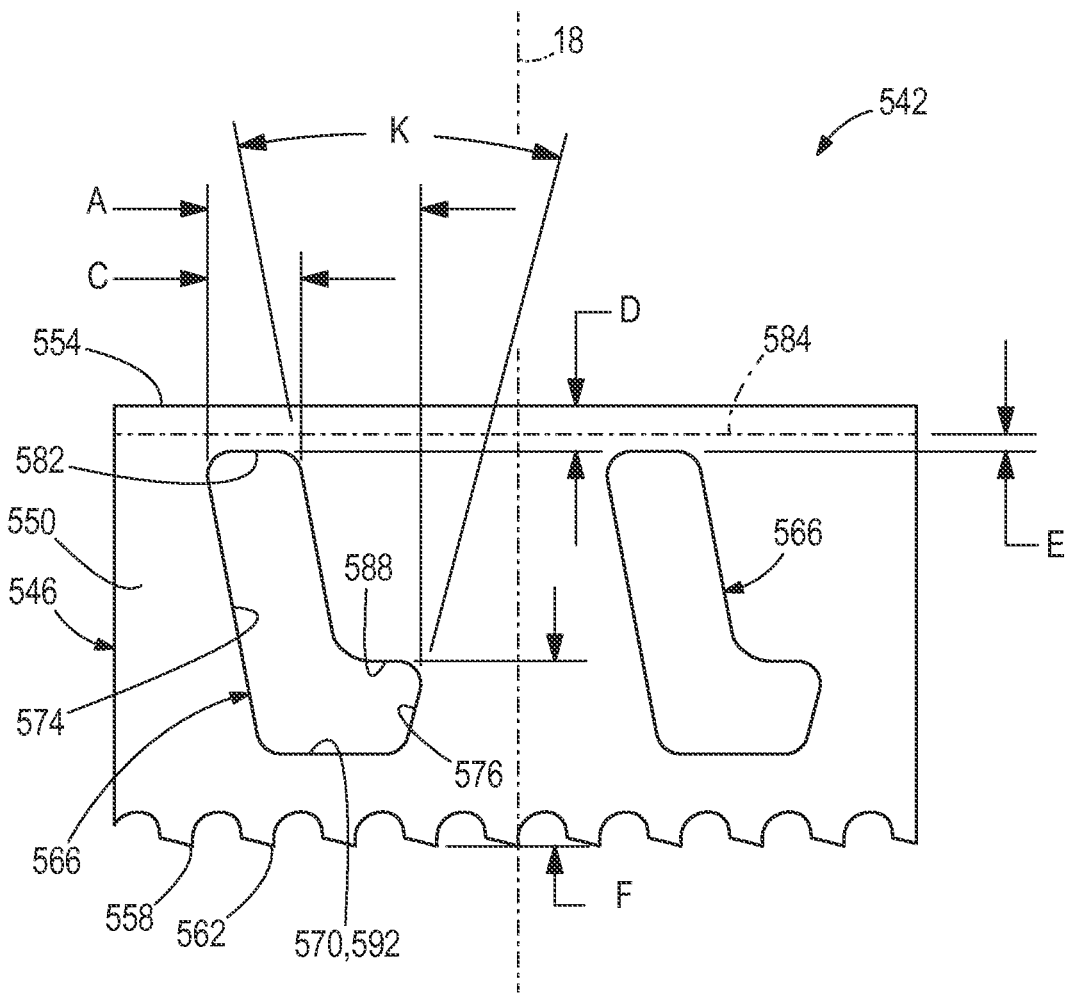
FIG. 18 is a planar view of a cylindrical body of a hole saw according to another embodiment of the invention.

FIG. 18 illustrates yet another embodiment of a hole saw 542. The hole saw 542 has substantial similarities to the hole saw 10, 156, 338, and 442 described with respect to FIGS. 1-4, 10, 14 and 16, and only those aspects that differ from the embodiments of FIGS. 1-4, 10, 14 and 16 will be described herein.

As shown in FIG. 18, the hole saw 542 includes a cylindrical body 546 having a side wall 550 extending between a cap end 554 and a cutting end 558. The cutting end 558 includes a plurality of cutting teeth 562. The plurality of cutting teeth 562 may be coated with an abrasive coating, e.g., diamond grit.

Elongated apertures 566 are defined within the side wall 550. Each aperture 566 is configured to receive a tool (not shown) for removing work piece plugs from within the cylindrical body 546. Each elongated aperture 566 is defined by a first slot portion 570 and a second slot portion 574. The elongated apertures 566 each have a circumferential width A, measured in a direction parallel to the cap end 554 and cutting end 558. In the illustrated embodiment, the circumferential width A is between approximately 0.595 inches and approximately 0.895 inches, more specifically between approximately 0.670 inches and approximately 0.820 inches, and even more specifically, approximately 0.745 inches. A circumferential width A within these ranges provides for greater access to a user when removing a work piece plug from the hole saw 542.

The first slot portion 570 is oriented substantially perpendicular to the axis 18. The second slot portion 574 connects to the first slot portion 570 and is oriented at an angle κ relative to an end wall 576 of the first slot portion 570, where the end wall 576 is oriented at approximately 15 degrees relative to the axis 18. In the illustrated embodiment, the angle κ is between approximately 25.5 degrees and approximately 26.5 degrees, but other embodiments may include other ranges.

A slot width C of the second slot portion 574, measured in a direction parallel to the cap end 554, is between approximately 0.280 inches and approximately 0.480 inches, more specifically, between approximately 0.330 inches and approximately 0.430 inches, and even more specifically, approximately 0.380 inches. A slot width C within these ranges of values allows for a greater range of tools to be inserted into the slot in order to remove a work piece plug.

The second slot portion 574 includes an upper wall 582 that is parallel to the cap end 554 and is located at a maximum distance D of approximately 0.188 inches from the cap end 554. The upper wall 582 is located at an axial offset E from a depth 584 of an axially extending portion 74 of a cap 66 (e.g., the axially extending portion 74 of the cap 66 described with respect to FIG. 2). In the illustrated embodiment, the axial offset E is between approximately 0.010 inches and approximately 0.120 inches, more specifically between approximately 0.030 inches and approximately 0.090 inches, and even more specifically, approximately 0.050 inches. Having an axial offset E within this range of values provides for easier removal of deep work piece plugs from within hole saw 542. Alternatively, the upper wall 582 of the second slot portion 574 may be oriented flush with the cap end 554 such that distance D is zero, or the second slot portion 574 may extend through a cap (not shown) coupled to the cap end 554.

The first slot portion 570 includes an upper wall 588 and a lower wall 592, each oriented substantially perpendicular to the axis 18. The upper wall 588 is disposed a distance F from the cutting end 558. In the illustrated embodiment, distance F is between approximately 0.050 inches and approximately 0.895 inches, more specifically between approximately 0.670 inches and approximately 0.820 inches, and even more specifically, approximately 0.745 inches. Having distance F within these ranges of values allows a user to apply more axially-aligned force when removing a plug from the hole saw 542.

Although the invention has been described with reference to certain preferred embodiments, variations and modifications exist within the scope and spirit of one or more independent aspects of the invention as described.

Thus, the invention provides, among other things, a hole saw. Various features and advantages of the invention are set forth in the following claims.

What is claimed is:

1. A hole saw comprising:
   a cylindrical body disposed along an axis of rotation with a side wall extending axially from a cap end to a cutting end, the cutting end including a plurality of cutting teeth; and
   a cap including a rim portion seated on the cap end and an axially extending portion extending into the cylindrical body from the cap end;
   wherein the side wall defines an aperture comprising:
      a first slot portion; and
      a second slot portion disposed closer to the cap end than the first slot portion, the second slot portion including a first wall oriented substantially perpendicular to the axis and a second wall oriented substantially perpendicular to the axis, the first wall of the second slot portion nearest the cap end being between approximately 0.010 inches and approximately 0.120 inches axially offset from the axially extending portion of the cap;
   wherein the first slot portion includes an upper wall and a lower wall, each oriented substantially perpendicular to the axis, the lower wall of the first slot portion being closer to the cutting end; and
   wherein the aperture has a first side and a second side, the first side including the first wall, the second wall, and the upper wall, the second side being non-linear and generally matching a contour of the first side, the second side including a bump curved toward the first side and a radial wall that provides a smooth transition from the first wall of the second slot portion to the bump with no undercut.

2. The hole saw of claim 1, further comprising a connecting slot portion connecting the first slot portion and the second slot portion.

3. The hole saw of claim 2, wherein the connecting portion is oriented at an angle of between approximately 60 degrees and approximately 80 degrees relative to the cap end.

4. The hole saw of claim 1, wherein the upper wall is between approximately 0.050 inches and 0.895 inches from the cutting end.

5. The hole saw of claim 1, wherein the aperture has a circumferential width, measured in a direction parallel to the cap end, of between 0.595 inches and approximately 0.820 inches.

6. The hole saw of claim 1, wherein the aperture has a circumferential width, measured in a direction parallel to the cap end, of between 1.250 inches and approximately 2.150 inches.

7. The hole saw of claim 1, wherein the second slot portion has a slot width measured in a direction parallel to the cap end of between approximately 0.305 inches and approximately 0.805 inches.

8. The hole saw of claim 1, wherein the wall of the second slot portion nearest the cap end is between approximately 0.030 inches and approximately 0.090 inches axially offset from the axially extending portion of the cap.

9. The hole saw of claim 1, wherein the first slot portion is substantially perpendicular to the axis, and the second slot portion is substantially non-parallel with the cap end.

10. The hole saw of claim 9, wherein the second slot portion intersects the first slot portion.

11. The hole saw of claim 1, wherein the cutting teeth include an abrasive coating.

12. The hole saw of claim 1, wherein the second wall of the second slot portion is spaced a first distance from the first wall of the second slot portion, wherein the second wall of the second slot portion is spaced a second distance from the upper wall of the first slot portion, and wherein the first distance is less than the second distance.

13. A hole saw comprising:
   a cylindrical body disposed along an axis of rotation and having a side wall extending axially from a cap end to a cutting end, the cutting end including a plurality of cutting teeth; and
   a cap including a rim portion seated on the cap end and an axially extending portion extending into the cylindrical body from the cap end;
   wherein the side wall defines an aperture comprising:
      a first slot portion oriented substantially perpendicular to the axis;
      a second slot portion oriented substantially perpendicular to the axis and disposed closer to the cap end than the first slot portion, the second slot portion including a first wall oriented substantially perpendicular to the axis and a second wall oriented substantially perpendicular to the axis, the second slot portion being circumferentially offset from the first slot portion, the first wall of the second slot portion nearest the cap end being between approximately 0.010 inches and approximately 0.120 inches axially offset from the axially extending portion of the cap; and
      a connecting slot portion connecting the first slot portion and the second slot portion; and
   wherein the first slot portion includes an upper wall and a lower wall, each oriented substantially perpendicular to the axis, the lower wall of the first slot portion being closer to the cutting end; and
   wherein the aperture has a first side and a second side, the first side including the first wall, the second wall, and the upper wall, the second side being non-linear and generally matching a contour of the first side, the second side including a bump curved toward the first side and a radial wall that provides a smooth transition from the first wall of the second slot portion to the bump with no undercut.

14. The hole saw of claim 13, wherein the connecting slot portion is substantially non-parallel with the cap end.

15. The hole saw of claim 13, wherein the connecting portion is oriented at an angle of between approximately 60 degrees and approximately 80 degrees relative to the cap end.

16. The hole saw of claim 13, wherein the aperture has a circumferential width, measured in a direction parallel to the cap end, of between 1.250 inches and approximately 2.150 inches.

17. The hole saw of claim 13, wherein the second slot portion has a slot width of between approximately 0.305 inches and 0.805 inches.

18. The hole saw of claim 13, wherein none of the first slot portion, the second slot portion, and the connecting slot portion intersects the cutting end.

19. The hole saw of claim 13, wherein none of the first slot portion, the second slot portion, and the connecting slot portion intersects the cap end.

* * * * *